(12) United States Patent
Kim et al.

(10) Patent No.: US 7,776,777 B2
(45) Date of Patent: Aug. 17, 2010

(54) CATALYST SUPPORT USING CELLULOSE FIBERS, PREPARATION METHOD THEREOF, SUPPORTED CATALYST COMPRISING NANO-METAL CATALYST SUPPORTED ON CARBON NANOTUBES DIRECTLY GROWN ON SURFACE OF THE CATALYST SUPPORT, AND METHOD OF PREPARING THE SUPPORTED CATALYST

(75) Inventors: Hee Yeon Kim, Daejeon (KR); Seong Ok Han, Daejeon (KR); Hong Soo Kim, Daejeon (KR); Nam Jo Jeong, Daejeon (KR)

(73) Assignee: Korea Institute of Energy Research, Yuseong-gu, Daejeon (KR)

( * ) Notice: Subject to any disclaimer, the term of this patent is extended or adjusted under 35 U.S.C. 154(b) by 0 days.

(21) Appl. No.: 12/166,513

(22) Filed: Jul. 2, 2008

(65) Prior Publication Data

US 2009/0176646 A1 Jul. 9, 2009

(30) Foreign Application Priority Data

Jan. 3, 2008 (KR) .................. 10-2008-0000900

(51) Int. Cl.
*B01J 27/20* (2006.01)
*C23C 16/22* (2006.01)

(52) U.S. Cl. .................. 502/172; 502/439; 427/249.3

(58) Field of Classification Search ................. 502/172
See application file for complete search history.

(56) References Cited

U.S. PATENT DOCUMENTS 4,938,942 A * 7/1990 Gorman et al. ............. 423/448
2004/0167014 A1 * 8/2004 Yan et al. .................... 502/101

OTHER PUBLICATIONS

He et al., Chem. Mater, 2003, 15, 4401-4406.*

* cited by examiner

*Primary Examiner*—Melvin C Mayes
*Assistant Examiner*—Yun Qian

(57) ABSTRACT

The present invention is directed to a porous catalyst support for maximizing an increase in catalytic reaction activity and a method of preparing a nano-metal-supported catalyst using the same. The method includes splitting cellulose fibers, thus preparing a catalyst support, growing carbon nanotubes on the prepared catalyst support, and supporting a nano-metal catalyst on the catalyst support having the carbon nanotubes grown thereon.

8 Claims, 7 Drawing Sheets

CATALYST SUPPORT USING CELLULOSE FIBERS, PREPARATION METHOD THEREOF, SUPPORTED CATALYST COMPRISING NANO-METAL CATALYST SUPPORTED ON CARBON NANOTUBES DIRECTLY GROWN ON SURFACE OF THE CATALYST SUPPORT, AND METHOD OF PREPARING THE SUPPORTED CATALYST

BACKGROUND OF THE INVENTION

1. Field of the Invention

The present invention relates in general to porous cellulose fibers having a plurality of micropores, which are used as a material of a catalyst support for supporting a nano-metal catalyst, thus maximizing the increase in catalytic reaction activity even when used in a small amount in various catalytic reactions, and to a method of preparing a nano-metal-supported catalyst using the same. More particularly, the present invention relates to a method of preparing a nano-metal-supported catalyst, including subjecting cellulose fibers cut to a predetermined length, to special treatment, thus preparing a catalyst support, growing carbon nanotubes on the surface of the catalyst support, and supporting a nano-metal catalyst on the surface of the grown carbon nanotubes, to a nano-metal-supported catalyst including a cellulose catalyst support, and to the use of cellulose fibers as a catalyst support for supporting a nano-metal catalyst.

2. Description of the Related Art

Recent research into catalysts is conducted toward the development of a catalyst support having a large surface area and the preparation of a catalyst metal on a nano scale. In particular, the development of a novel catalyst support material, which has a large surface area and is inexpensive to prepare, is regarded as more valuable.

Useful as a catalyst support in the present invention, cellulose fibers are a material that is easily purchased and is very inexpensive, and are widely used as a lightweight composite material, an adsorption and filtration material, or a reinforcing agent, due to the greatly superior intrinsic properties in terms of surface area, porosity, and physical strength. However, research into the use of cellulose fibers as a catalyst support through a series of procedures has not yet been performed domestically or abroad. Considering that conventional catalyst supports, such as mesoporous carbon, activated carbon, carbon black and so on, suffer from high preparation costs, the use of cellulose fibers creates incredible value and enables the development of novel nano-bio-eco-friendly hybrid energy material. Further, in the case where conventional techniques for directly growing carbon nanotubes on graphite paper and for supporting a nano-platinum catalyst on the carbon nanotubes using chemical vapor deposition (CVD) (Korean Patent Application No. 10-2007-0015801) are applied to the present invention, it is obvious that the activity of the catalyst is further increased.

The carbon nanotubes have superior electrical conductivity, specific surface area, and hydrogen storage performance, and also themselves have very high adsorption properties. As well, because carbon nanotubes have a specific surface structure, they can prevent the aggregation of metal particles when supported with the metal particles. Thus, the carbon nanotubes are expected to be used as a catalyst support. However, research into carbon nanotubes to date is mainly concerned with the synthesis thereof, and studies on the application thereof are very poor, attributable to difficulty in mass production and problems of preparation costs. Moreover, attempts to apply carbon nanotubes as a catalyst support are very few.

Accordingly, the present invention is intended to develop a high-performance supported catalyst by growing carbon nanotubes on the surface of a cellulose catalyst support and supporting various nano-metal catalysts (e.g., platinum, palladium, cobalt, molybdenum, ruthenium, etc.) on the grown carbon nanotubes, through a very simple process incurring low expenses. As such, the nano-metal catalyst is supported not through impregnation, which is typical, but through chemical vapor deposition (CVD), which is disclosed in Korean Patent Application No. 10-2007-0015801. The reason why CVD is used to support the metal catalyst particles is that the size of the catalyst particles is considerably decreased and the degree of dispersion of the catalyst particles is very high. A platinum catalyst made of precious metal is widely used for various hydrogenation and reforming reactions, and exhibits activity superior to other metal catalysts, but is problematic in terms of high preparation costs. Thus, in order to overcome these problems, it is important that the size of the platinum catalyst particles, which are a catalytic active phase, be decreased to a nano size, and that the catalyst be supported in a high dispersion state, whereby the platinum catalyst is used in a minimum amount to thus maximize the number of catalytic active sites. To this end, the surface area of the catalyst support that supports the catalyst should be very large, and further, in the supporting procedure, the catalyst metal particles should not be aggregated on the surface of the catalyst support.

To date, examples in which only cellulose fibers are used as a catalyst support through a series of treatment procedures have not yet been introduced. Similarly, U.S. Patent Application Publication No. 2006/0286434 A1 discloses that an electrically conductive carbonaceous material is incorporated into a cellulose matrix to thus prepare a cellulose composite, which is then used to form electrodes for fuel cells. Further, U.S. Pat. No. 4,253,990 discloses a method of preparing a porous catalyst support in which natural diatomite, bentonite clay, silica, cellulose fibers, corn meal, and water are mixed, extruded, pelleted, dried, and calcined.

In addition, K. Rajender Reddy et al reported the preparation of a cellulose supported palladium catalyst by incorporating commercially available microcrystalline cellulose (S. D. Fine chemicals., India) into a catalyst metal solution (*Journal of molecular catalysis A: chemical* 252 (2006) 12-16). Further, B. Azambre et al reported the synthesis of a carbon support through thermal treatment of commercially available microcrystalline cellulose (Aldrich) and the adjustment of the hydrophilic properties of the surface of the carbon support through a series of treatment procedures to make the carbon support suitable for use as a catalyst support (*Journal of analytical and applied pyrolysis* 55 (2000) 105-117).

As mentioned above, attempts to use cellulose fibers themselves as a catalyst support have not yet been made. The present invention applies cellulose, which is a resource that is abundantly present on the earth, as a catalyst support having high value, and is thus estimated to be very important in terms of nano-bio-eco-friendly techniques.

SUMMARY OF THE INVENTION

Leading to the present invention, thorough research aiming to solve the problems encountered in the related art, carried out by the present inventors, resulted in the finding that, when cellulose fibers, which have a large surface area and high porosity and are relatively inexpensive, are used as a catalyst support, a novel catalyst support suitable for nano-bio-eco-friendly hybrid techniques may be realized.

Therefore, the present invention provides a nano-metal-supported catalyst, in which porous cellulose fibers having a plurality of micropores are used as material for a catalyst support for supporting a nano-metal catalyst, thereby decreasing the catalyst preparation cost, maximizing the increase in catalytic reaction activity even with the use of a small amount thereof in various catalytic reactions, and making it easy to collect the expensive nano-metal catalyst component after the reaction.

According to the present invention, a method of preparing a nano-metal-supported catalyst may comprise a first step of splitting cellulose fibers, thus preparing a catalyst support, a second step of growing carbon nanotubes on the prepared catalyst support, and a third step of supporting a nano-metal catalyst on the catalyst support having the carbon nanotubes grown thereon.

Below, the method of preparing the nano-metal-supported catalyst according to the present invention is more specifically described.

$1^{st}$ Step: Preparation of Cellulose Catalyst Support

The preparation of the catalyst support from the split cellulose fibers includes (A) splitting cellulose fibers into individual fibers on a micrometer scale and cutting the split fibers to a predetermined length and (B) carbonizing the cut cellulose fibers.

$2^{nd}$ Step: Growth of Carbon Nanotubes

The growth of the carbon nanotubes on the cellulose catalyst support prepared in the first step includes (C) supporting a catalyst metal for growing carbon nanotubes on the surface of the carbonized cellulose catalyst support and (D) supplying a carbon source to the surface of the cellulose catalyst support supported with the catalyst metal for growing carbon nanotubes, thus growing the carbon nanotubes.

$3^{rd}$ Step: Supporting of Nano-Metal Catalyst on Carbon Nanotubes

The supporting of the nano-metal catalyst on the surface of the carbon nanotubes prepared in the second step includes (E) removing the catalyst metal for growing carbon nanotubes from the carbon nanotubes grown on the surface of the cellulose catalyst support and performing pretreatment for supporting the nano-metal catalyst, and (F) supporting the nano-metal catalyst on the surface of the carbon nanotubes grown on the surface of the cellulose catalyst support, which is pretreated, using CVD.

Through the series of processes mentioned above, the nano-metal-supported catalyst according to the present invention, in which the nano-metal catalyst is supported on the cellulose catalyst support, is prepared.

In addition, the present invention provides a nano-metal-supported catalyst including a cellulose catalyst support, carbon nanotubes directly grown on the catalyst support, and nano-metal catalyst particles supported on the surface of the carbon nanotubes.

BRIEF DESCRIPTION OF THE DRAWINGS

These, and other features and advantages of the invention, will become clear to those skilled in the art from the following detailed description of the preferred embodiments of the invention, given in conjunction with the appended drawings.

DESCRIPTION OF THE PREFERRED EMBODIMENTS

Hereinafter, a detailed description will be given of a method of preparing a nano-metal-supported catalyst according to the present invention with reference to the appended drawings.

Figure 1:
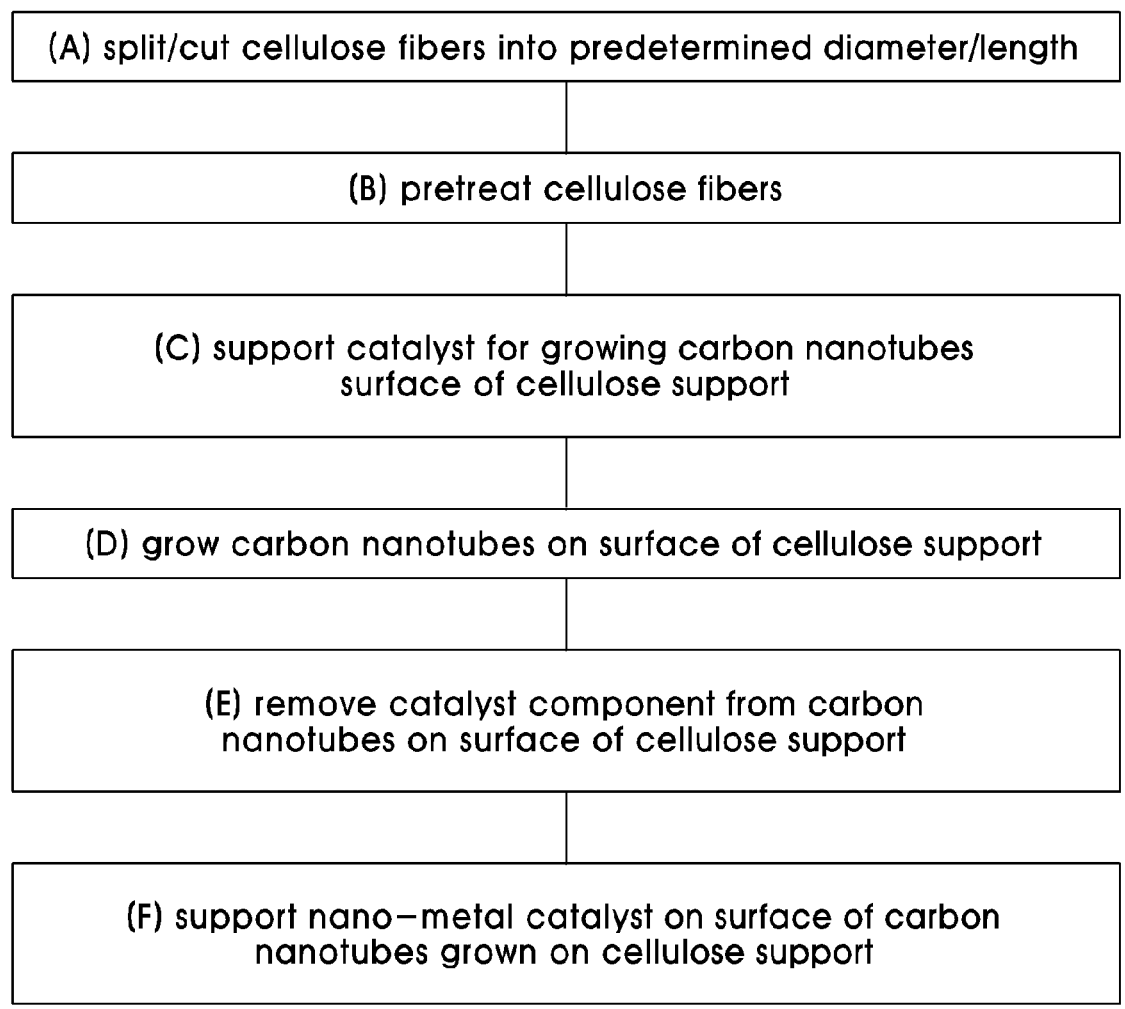
FIG. 1 is a flowchart for schematically showing a process of preparing a nano-metal-supported catalyst, according to the present invention.

FIG. 1 schematically shows the process of preparing a nano-metal-supported catalyst according to the present invention.

The method of preparing the nano-metal-supported catalyst includes (A) splitting cellulose fibers into individual fibers on a micrometer scale, and cutting the split fibers to a predetermined length, (B) carbonizing the cut cellulose fibers through thermal treatment, thus preparing a catalyst support for supporting a nano-metal catalyst, (C) supporting a catalyst metal for growing carbon nanotubes on the surface of the carbonized cellulose catalyst support, (D) supplying a carbon source to the surface of the cellulose catalyst support supported with the catalyst metal for growing carbon nanotubes, thus growing the carbon nanotubes, (E) removing the catalyst metal for growing carbon nanotubes from the carbon nanotubes grown on the surface of the cellulose catalyst support, and performing pretreatment for supporting the nano-metal catalyst, and (F) supporting the nano-metal catalyst on the surface of the carbon nanotubes grown on the surface of the cellulose catalyst support, which is pretreated, using CVD.

Specifically, in (A), raw cellulose material is split into individual fibers having a diameter of ones of μm, and is then cut to a predetermined length, so that it is provided in the form of a catalyst support.

The raw cellulose material is selected from among henequen, kenaf, abaca, bamboo, hemp, flax, jute, pineapple, ramie, and sisal, split into individual fibers having a diameter ranging from tens to hundreds of μm, and then cut to a length of 1~2 mm in a state of being immersed in liquid nitrogen.

In (B), the cut cellulose fibers are carbonized through a series of pretreatment procedures, thus preparing the catalyst support.

The cellulose fibers prepared in the form of the catalyst support through (A) are heated to 500~1500° C. at a heating rate of 5~20° C./min in an atmosphere of hydrogen and nitrogen at 1:1, and are then maintained at 500~1500° C. for 0.5~2 hours, thereby preparing the carbonized catalyst support. In this procedure, impurities are removed from the cellulose fibers, and thus the wall thickness of the fibers themselves is decreased, and also, the spaces in which the impurities (wax, fat components) are present are maintained in the form of inner pores.

Subsequently, in order to increase the wettability of the surface of the cellulose catalyst support, the cellulose catalyst support is immersed in a 0.1~0.5 mol sulfuric acid aqueous solution, and is then treated for 10~60 cycles at a sweep rate of 50 mV/s at −0.15~1.3 V. The concentration of the sulfuric acid aqueous solution varies depending on the material of the cellulose catalyst support and the structure thereof. When the concentration thereof is lower than 0.1 mol, surface treatment effects are deteriorated. Conversely, when the concentration is greater than 0.5 mol, the cellulose catalyst support may corrode. The voltage is applied in the range of −0.15~1.3 V. If the voltage is applied outside of the above range, the cellulose support may be damaged. The treatment frequency is also adjusted depending on the material of the catalyst support or the concentration of the sulfuric acid solution. When the treatment frequency is less than 10 cycles, no treatment effects are exhibited. Conversely, when the treatment frequency exceeds 60 cycles, surface damage may be caused.

In (C), in order to grow the carbon nanotubes on the surface of the carbonized cellulose catalyst support, the catalyst metal, such as nickel, cobalt, iron, or metal mixture particles thereof, is supported.

The cellulose catalyst support, which is treated with sulfuric acid and then dried in (B), is repeatedly subjected 1~10 times to immersion in an aqueous solution having a concentration of 0.1~1 mol using nitrate or acetate of nickel, cobalt, iron, or a mixture thereof as a precursor and then to sonication, so that the metal particles are uniformly dispersed on the surface of the cellulose catalyst support. When the concentration of the precursor solution is less than 0.1 mol, it is difficult to support the metal on the surface of the cellulose catalyst support. Conversely, when the concentration exceeds 1 mol, the amount of metal that is supported is large but the metal particles are increasingly aggregated in the form of lumps. As the immersion frequency is increased, the amount of metal that is supported on the surface of the cellulose catalyst support is increased. A process of drying under atmospheric conditions is inserted between immersions to realize effective support of the metal particles.

In (D), the carbon source in a gas phase is supplied to the surface of the cellulose catalyst support, and an appropriate temperature is maintained, thus growing the carbon nanotubes.

The cellulose catalyst support supported with nickel, cobalt, iron or mixtures thereof in (C) is positioned at the center of a quartz tube located in a furnace. The pressure inside the tube is reduced to 6~10 torr, and this state is maintained for 30 min or longer, thereby removing impurities from the quartz tube. Then, nitrogen (50~300 sccm (standard cubic centimeter per minute)) is allowed to flow into the tube at room temperature for 1 hour or longer, so that the state inside the tube becomes inactive. When the flow rate of nitrogen is less than 50 sccm, the flow thereof in the quartz tube is non-uniform. Conversely, when the flow rate exceeds 300 sccm, sufficient residence time required for the reaction is difficult to realize.

Subsequently, in order to reduce nickel, cobalt, iron or metal mixture thereof which is in an oxide form and to remove a functional group from the precursor compound of the metal to thus obtain only the pure catalyst metal, while hydrogen (30~150 sccm) is allowed to additionally flow, the temperature inside the tube is increased to a temperature (400~500° C.), capable of reducing the metal, and is then maintained at that temperature for 2 hours, thus causing the complete reduction of the metal component. Subsequently, the temperature is continuously increased at a heating rate of 10° C./min. Then, when the temperature inside the quartz tube reaches 600~800° C., at which the active growth of the carbon nanotubes occurs, the carbon source (2~300 sccm), such as methane, benzene, ethanol, or xylene, is supplied, so that the carbon nanotubes begin to grow on the surface of the cellulose catalyst support. When the number of carbon atoms in the molecule of the carbon source used is large, the flow rate is decreased to about 2~3 sccm. Conversely, when the number of carbon atoms is small, as in methane, a high flow rate of 100 sccm or more is preferably applied. This state is maintained for a period of time ranging from 10 min to 6 hours, and the reaction time is adjusted depending on the type of carbon source used and the desired growth form (length, density, thickness, etc.) of carbon nanotubes.

In (E), nickel, cobalt, iron or a metal mixture thereof, used as the catalyst, is removed from the carbon nanotubes grown on the surface of the cellulose catalyst support, and the surface of the carbon nanotubes is pretreated to support the nano-metal catalyst.

As such, hydrochloric acid treatment is conducted, so that nickel, cobalt, iron or a mixture component thereof, used as the catalyst, is removed from the carbon nanotubes grown on the surface of the cellulose catalyst support in (D). The cellulose catalyst support on which the carbon nanotubes are grown is immersed in a hydrochloric acid solution (6~10 mol), maintained for 6~24 hours, washed with DI water, and then dried in an oven at 100~120° C. for 12~24 hours. If the temperature of the oven is lower than 100° C., it is difficult to remove moisture. Conversely, if the temperature is higher than 120° C., the specimen may be deformed. Further, drying is performed for a time period from 12 hours to 24 hours, thereby completely removing moisture. Also, when the concentration of the hydrochloric acid solution is less than 6 mol, treatment effects are deteriorated. In contrast, when the concentration is greater than 10 mol, the surface of the cellulose catalyst support may corrode.

Thereafter, in order to improve the wettability of the surface of the carbon nanotubes, to substitute the oxidizing group, and to make defects necessary for effective deposition of the nano-metal catalyst, the specimen is immersed in an acid mixture solution (14 M nitric acid is mixed with 98% sulfuric acid at a volume ratio of 1:1), and is then treated for 5~300 min under reflux at 50~70° C. When nitric acid and sulfuric acid of the acid mixture solution are mixed at a ratio of 1:1, the treatment effect thereof is excellent. Further, when the concentration of the acid mixture solution is less than the above lower limit, the treatment effect is deteriorated. Conversely, when the concentration is higher than the above upper limit, serious surface corrosion may result. Although the treatment effect is shown even at room temperature, the case where the use temperature is 50° C. or higher results in good treatment effects, and extreme evaporation of the acid mixture may occur at 70° C. or higher. The treatment time varies depending on the structure of the carbon nanotubes and the carbon paper, and is adjusted in the range of about 5 min to form slight defects. If the treatment is performed for 300 min or longer, the cellulose catalyst support and the carbon nanotubes may be seriously deformed. The treated specimen is washed several times with DI water, and is then dried in an oven at 100~120° C. for 12~24 hours, thus removing moisture.

In (F), the nano-metal catalyst is supported on the surface of the carbon nanotubes grown on the surface of the cellulose catalyst support, using CVD.

The nano-metal catalyst includes one or more selected from the group consisting of platinum, palladium, cobalt, molybdenum, and ruthenium.

The cellulose support, on which the carbon nanotubes are grown, resulting from (E), is positioned at the center of the quartz tube, and, as in (C), the pressure inside the tube is maintained at 6~10 torr for 30 min at 100~120° C., thus removing impurities from the quartz tube. Thereafter, while nitrogen (50~300 sccm) is allowed to flow into the tube, the flow thereof is maintained for 1 hour or longer. To support the nano-metal catalyst using CVD, the temperature inside the quartz tube is changed to 80~300° C. at a heating rate of 10° C./min. Then, when the temperature reaches a reaction temperature, the precursor of the nano-metal catalyst in a gas phase begins to flow, so that the nano-metal catalyst particles are supported on the surface of the carbon nanotubes.

In order to support the nano-metal catalyst particles on the surface of the carbon nanotubes grown on the cellulose catalyst support, the precursor of the nano-metal catalyst is placed in the evaporator in the oven and is then heated to 60~80° C. to evaporate the precursor.

Thereafter, when the temperature of the precursor reaches a predetermined level, the flow path of nitrogen, which directly flows into the quartz tube, is changed so that nitrogen flows via the evaporator, whereby the precursor of the nano-metal catalyst in a gas phase is transferred to the cellulose catalyst support positioned in the quartz tube along the flow path of nitrogen as a carrier gas. As such, the temperature of a connector for connecting the oven provided with the evaporator and the furnace for heating the quartz tube is equally maintained, and the point in time at which the precursor of the nano-metal catalyst begins to flow into the quartz tube is controlled to be the same as the point in time at which the temperature of the cellulose catalyst support reaches the reaction temperature.

Preferably, when the temperature of the precursor reaches 60~80° C., the flow path of nitrogen (10~300 sccm) which directly flows into the quartz tube is changed so that nitrogen flows via the evaporator, thereby transferring the precursor of the nano-metal catalyst in a gas phase to the cellulose catalyst support positioned in the quartz tube along the flow path of nitrogen as a carrier gas. In this case, the temperature of the connector for connecting the oven provided with the evaporator and the furnace for heating the quartz tube is also maintained at 60~80° C., at which the complete evaporation of the precursor occurs, and the point in time at which the precursor of the nano-metal catalyst begins to flow into the quartz tube is adjusted to be the same as the point in time at which the temperature of the cellulose catalyst support reaches 80~300° C., which is a reaction temperature. This temperature is maintained for a predetermined time (0.5~24 hours). The reaction time is adjusted depending on the amount of the nano-metal catalyst to be supported, and may be 24 hours or longer in the case where the nano-metal catalyst is supported in a maximum amount.

Ultimately, in the supported catalyst according to the present invention, obtained by supporting the nano-metal catalyst on the carbon nanotubes directly grown on the cellulose fibers serving as the catalyst support, the preparation cost thereof can be considerably decreased compared to catalysts which are conventionally supported using a catalyst support such as alumina or carbon black through a general impregnation process. Further, because the cellulose fibers used as the catalyst support have high porosity and a large surface area, the catalytic reaction area is greatly increased, and also, the nano-metal catalyst particles can be supported in a high dispersion state through CVD. Thereby, the number of catalytic active sites is greatly increased, and a catalyst having high performance can be prepared even when using the precursor of the nano-metal catalyst in a small amount.

A better understanding of the present invention may be obtained through the following examples, which are set forth to illustrate, but are not to be construed as the limit of the present invention.

EXAMPLES

Example 1

(A) Henequen cellulose was split into individual fibers having a diameter ranging from tens to hundreds of μm, and was then cut to a length of 1~2 mm in a state of being immersed in liquid nitrogen, thus obtaining a henequen cellulose catalyst support. If the fibers are split to have a diameter of sections thereof in the range of ones of μm, the surface area is advantageously increased. However, in the present invention, the fibers were individually split to a diameter ranging from tens to hundreds of μm through manual work.

Figure 2:
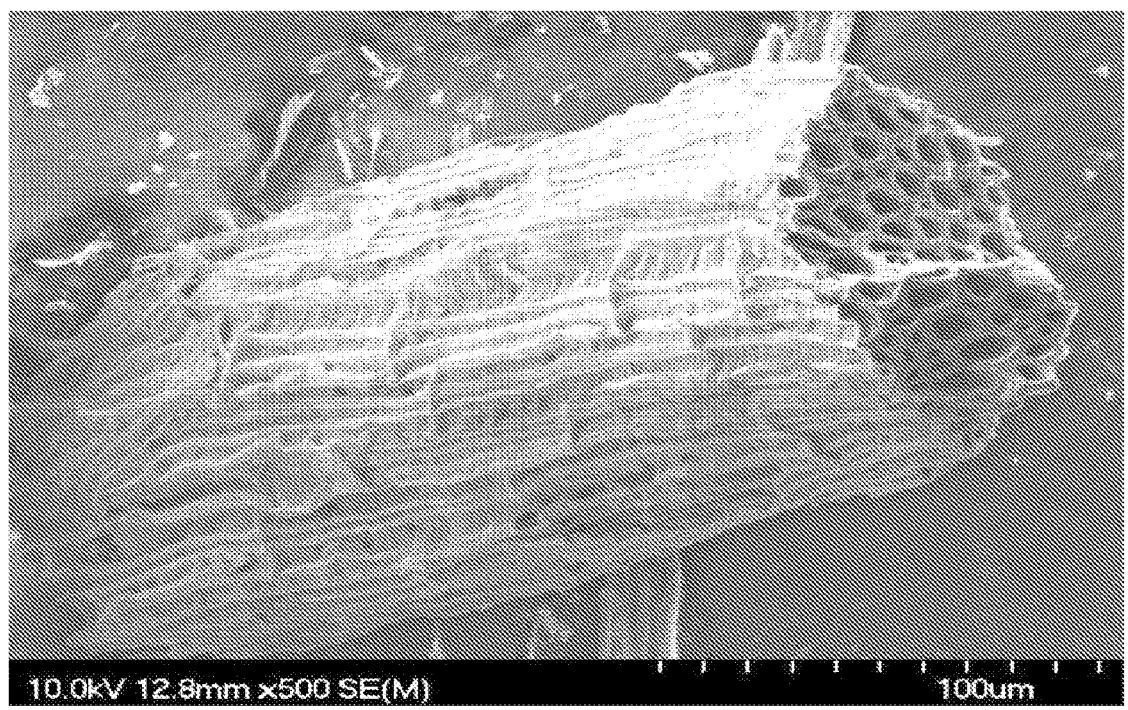
FIG. 2 is a scanning electron microscope (SEM) image showing the cellulose support, which is carbonized in (B) of Example 1 after cutting the cellulose fibers in (A) of Example 1.

(B) The cellulose fibers cut to a predetermined diameter and length through (A) were heated to 700° C. at a heating rate of 10° C./min in an atmosphere of hydrogen and nitrogen at 1:1, and were then maintained at 700° C. for 30 min, thereby preparing the carbonized catalyst support. Thereafter, the cellulose catalyst support was immersed in a 0.1 mol sulfuric acid aqueous solution, and was then treated for 60 cycles at a sweep rate of 50 mV/s at −0.15~1.3 V. The treated cellulose catalyst support was observed using an SEM. The results are shown in FIG. 2.

Figure 3:
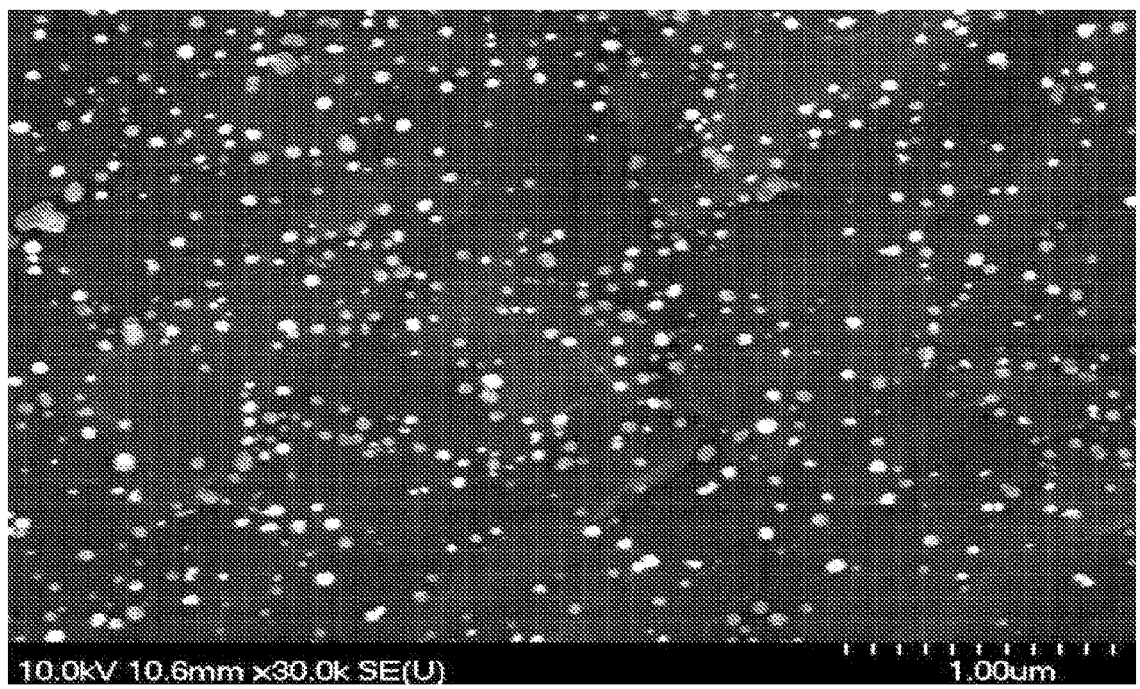
FIG. 3 is an SEM image showing the surface of the carbonized cellulose fibers supported with a nickel catalyst for growing carbon nanotubes, obtained in (C) of Example 1.

(C) In order to grow carbon nanotubes on the surface of the pretreated cellulose support, the cellulose catalyst support, which was treated with sulfuric acid and then dried, was immersed in an aqueous solution having a concentration of 0.1 mol using nickel nitrate or acetate as a precursor, and was then sonicated. These procedures were repeated three times, thus uniformly dispersing the metal particles on the surface of the cellulose catalyst support. The surface of the cellulose catalyst support supported with the metal particles was observed using an SEM. The results are shown in FIG. 3.

(D) The cellulose catalyst support on which the nickel particles were supported was positioned at the center of a quartz tube located in a furnace, and the pressure inside the quartz tube was reduced to 10 torr and was then maintained for 30 min or longer so that impurities were removed from the quartz tube. Thereafter, nitrogen was allowed to flow into the tube at 100 sccm at room temperature for 1 hour or longer, and thus the state inside the quartz tube was converted and thus made inactive.

Figure 4:
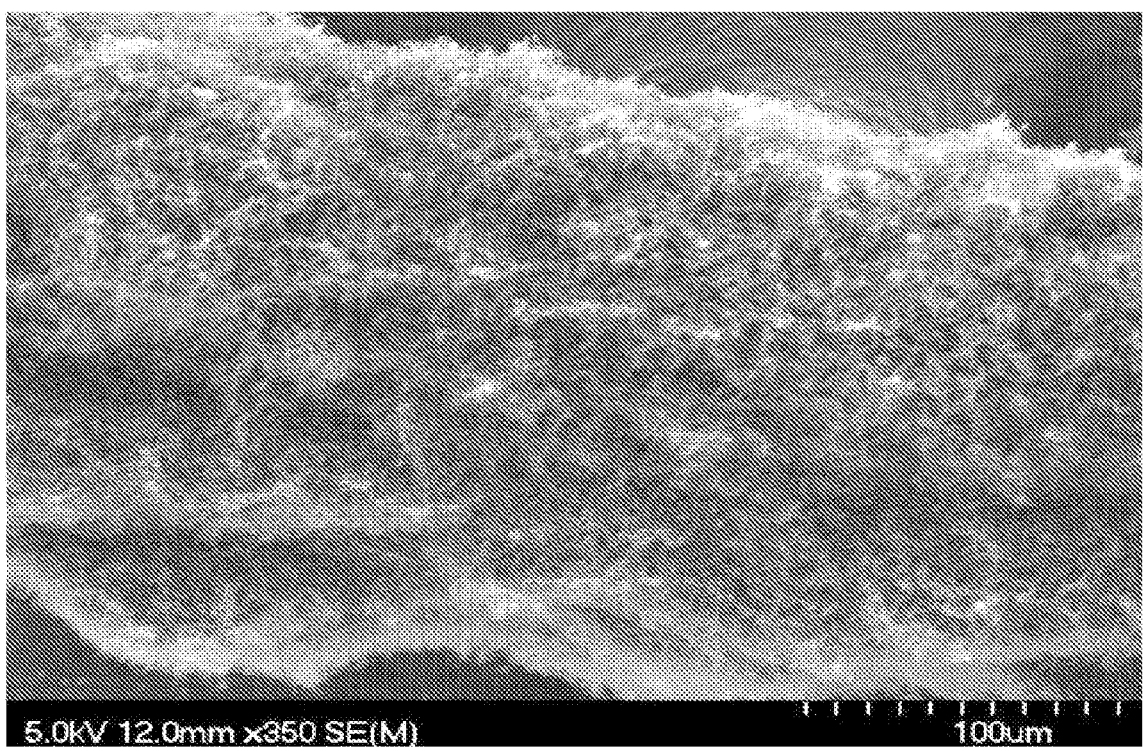
FIG. 4 is an SEM image showing the surface of the cellulose support having the carbon nanotubes grown thereon, obtained in (D) of Example 1.

Subsequently, in order to reduce nickel metal in an oxide form, while hydrogen was additionally supplied at 100 sccm, the temperature inside the tube was increased to 500° C., capable of reducing the metal component, and was then maintained at that temperature for 2 hours, thus causing the metal component to be completely reduced. Subsequently, the temperature was continuously increased at a heating rate of 10° C./min. Then, when the temperature reached 700° C., acetylene as a carbon source was supplied at 2 sccm, and the carbon nanotubes were thus grown on the surface of the cellulose catalyst support. The cellulose catalyst support having the carbon nanotubes grown thereon was observed using an SEM. The results are shown in FIG. 4.

(E) In order to remove the nickel metal used as the catalyst from the carbon nanotubes grown on the surface of the cellulose catalyst support, the cellulose electrode was immersed in a 6 mol hydrochloric acid solution, maintained for 24 hours, washed with DI water, and then dried in an oven at 110° C. for 12 hours.

Thereafter, the specimen was immersed in an acid mixture solution of 14 M nitric acid and 98% sulfuric acid mixed at a volume ratio of 1:1 and was then treated for 5 min under reflux at 50~70° C.

(F) The cellulose catalyst support having the carbon nanotubes grown thereon, resulting from (A)~(E), was positioned at the center of the quartz tube, and the pressure inside the tube was maintained at 10 torr for 30 min at 110° C., as in (C), so that the impurities were removed from the quartz tube. While nitrogen was allowed to flow into the tube at 100 sccm, the flow of nitrogen was maintained for 1 hour or longer. In order to support the platinum catalyst using CVD, the temperature inside the quartz tube was changed to 140° C. at a heating rate of 10° C./min. Then, when the temperature reached the reaction temperature, the platinum precursor in a gas phase began to flow into the tube, and thereby the platinum catalyst particles were supported on the surface of the carbon nanotubes.

The platinum precursor was placed in the evaporator in the oven, and was then heated to 60° C., thus evaporating the precursor. When the temperature of the precursor reached 60° C., the flow path of 100 sccm of nitrogen directly flowing into the quartz tube was changed so that nitrogen was supplied via the evaporator, thereby transferring the platinum precursor in a gas phase to the cellulose catalyst support, positioned in the quartz tube along the flow path of nitrogen, which was the carrier gas. As such, the temperature of the connector for connecting the oven provided with the evaporator and the furnace for heating the quartz tube was also maintained at 60° C., at which the complete evaporation of the precursor was caused. The point in time at which the platinum precursor began to flow into the quartz tube was controlled to be the same as the point in time at which the temperature of the cellulose catalyst support was 140° C. This temperature was maintained for 2 hours. The supported catalyst having the platinum catalyst supported on the carbon nanotubes grown on the surface of the cellulose catalyst support was observed using a transmission electron microscope. The results thereof are shown in FIG. 5.

Figure 5:
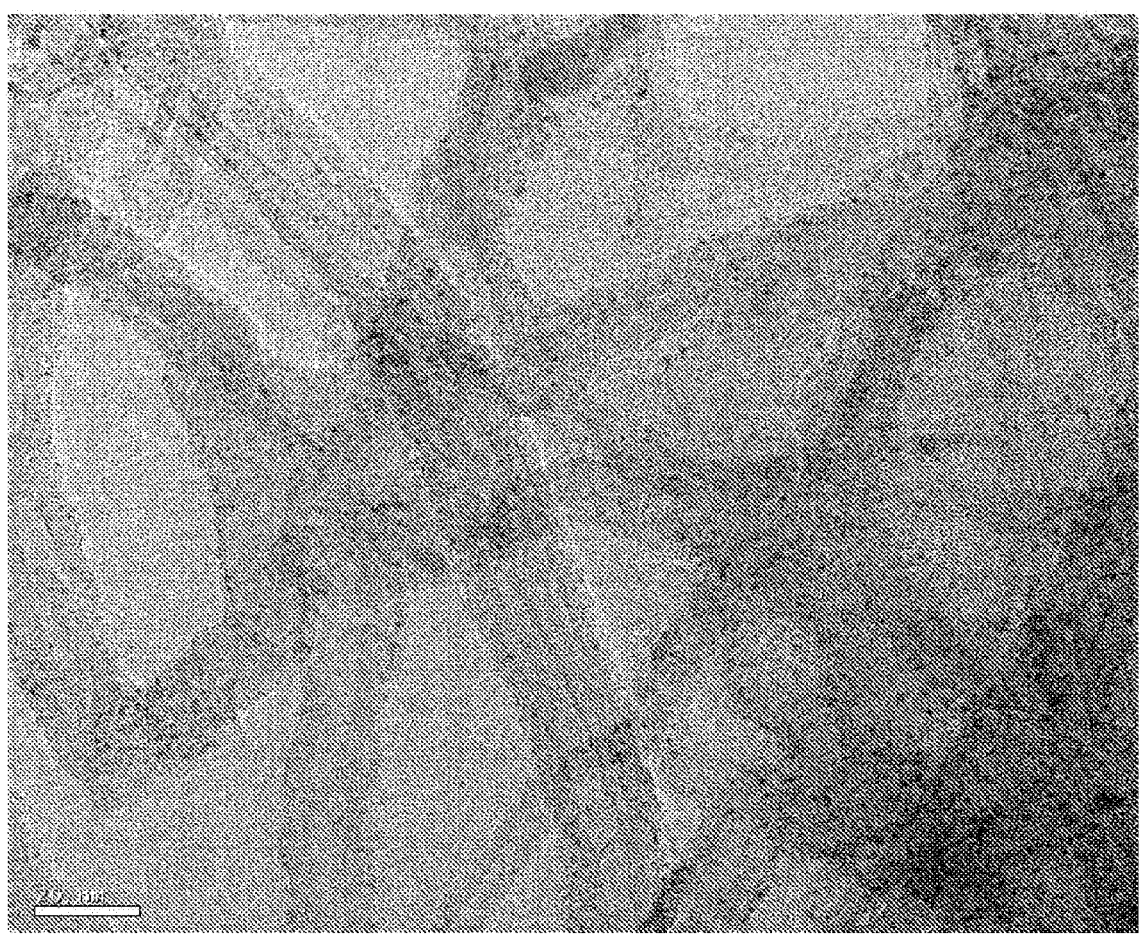
FIG. 5 is a transmission electron microscope image showing the surface of a catalyst specimen in which the nano-platinum catalyst is supported on the surface of the carbon nanotubes grown on the surface of the cellulose support, obtained in (F) of Example 1.

From FIG. 5, in the supported catalyst obtained through the above process, the nano-platinum catalyst particles could be seen to be supported on the surface of the carbon nanotubes having an improved surface structure directly grown on the surface of the cellulose catalyst support.

Comparative Example 1

Conventionally useful as a carbonaceous catalyst support, carbon black (Vulcan XC-72, Carbot) was dried in an oven at 110° C. for 12 hours to remove moisture, and was then used as the catalyst support.

0.1 g of the dried carbon black catalyst support was used to support the platinum catalyst through the same CVD as in (F) of Example 1, thus preparing a supported catalyst.

Comparative Example 2

Conventionally useful as a catalyst support of a heterogeneous catalyst, γ-Al$_2$O$_3$ (97.7%, Strem Chemical Inc.) was dried in an oven at 110° C. for 12 hours to remove moisture, and was then used as the catalyst support.

0.1 g of the dried γ-Al$_2$O$_3$ was used to support the platinum catalyst through the same CVD as in (F) of Example 1, thus preparing a supported catalyst.

Test Example 1

Measurement of BET Surface Area, Micropore Volume, and Micropore Area

The BET surface area, micropore volume, and micropore area of the cellulose catalyst support prepared in (B) of Example 1, the cellulose catalyst support having the carbon nanotubes grown thereon obtained in (D) of Example 1, the dried carbon black (Vulcan XC-72, Carbot) catalyst support of Comparative Example 1, and the dried γ-Al$_2$O$_3$ catalyst support of Comparative Example 2 were measured. The results are shown in Table 1 below.

TABLE 1

| | BET Surface Area, Micropore Volume, Micropore Area | | | |
|---|---|---|---|---|
| | | BET Surface Area (m$^2$/g) | Micropore Volume (cm$^3$/g) | Micropore Area (m$^2$/g) |
| Ex. 1 | Cellulose catalyst support through (B) | 205.6 | 0.0952 | 181.3 |
| | Cellulose catalyst support having carbon nanotubes grown thereon through (D) | 250 | 0.0951 | 179.6 |
| C. Ex. 1 | Dried carbon black catalyst support | 235.0 | 0.0345 | 67.1 |
| C. Ex. 2 | Dried γ-Al$_2$O$_3$ catalyst support | 207.2 | 0.0014 | 6.6 |

As is apparent from Table 1, the henequen cellulose catalyst support subjected to thermal treatment in (B) of Example 1 had a surface area similar to that of each of the carbon black catalyst support of Comparative Example 1 and the γ-Al$_2$O$_3$ catalyst support of Comparative Example 2, but the micropore volume and micropore area thereof were remarkably larger. In this way, the henequen cellulose catalyst support of Example 1 has microporous properties which are very advantageous for the catalytic reaction, and can thus be determined to be the best catalyst support. Further, in the case of the cellulose catalyst support having the carbon nanotubes grown thereon, obtained in (D) of Example 1, the surface area was greatly increased due to the growth of the carbon nanotubes, compared to the cellulose catalyst support prepared in (B) of Example 1, but there were almost no differences in micropore volume and micropore area therebetween. This is considered to be due to the offset effects by which the micropore volume and micropore area may be increased thanks to the micropores of the carbon nanotubes themselves, but part of the micropores of the surface of the cellulose support may be clogged in the course of growing the carbon nanotubes.

Test Example 2

Analysis of CO Chemical Adsorption Capacity of Supported Catalyst

The platinum-supported catalyst of each of Example 1 and Comparative Examples 1 and 2 was measured for the amount of CO adsorbed per unit mass of catalyst. The results are shown in FIG. 6.

Figure 6:
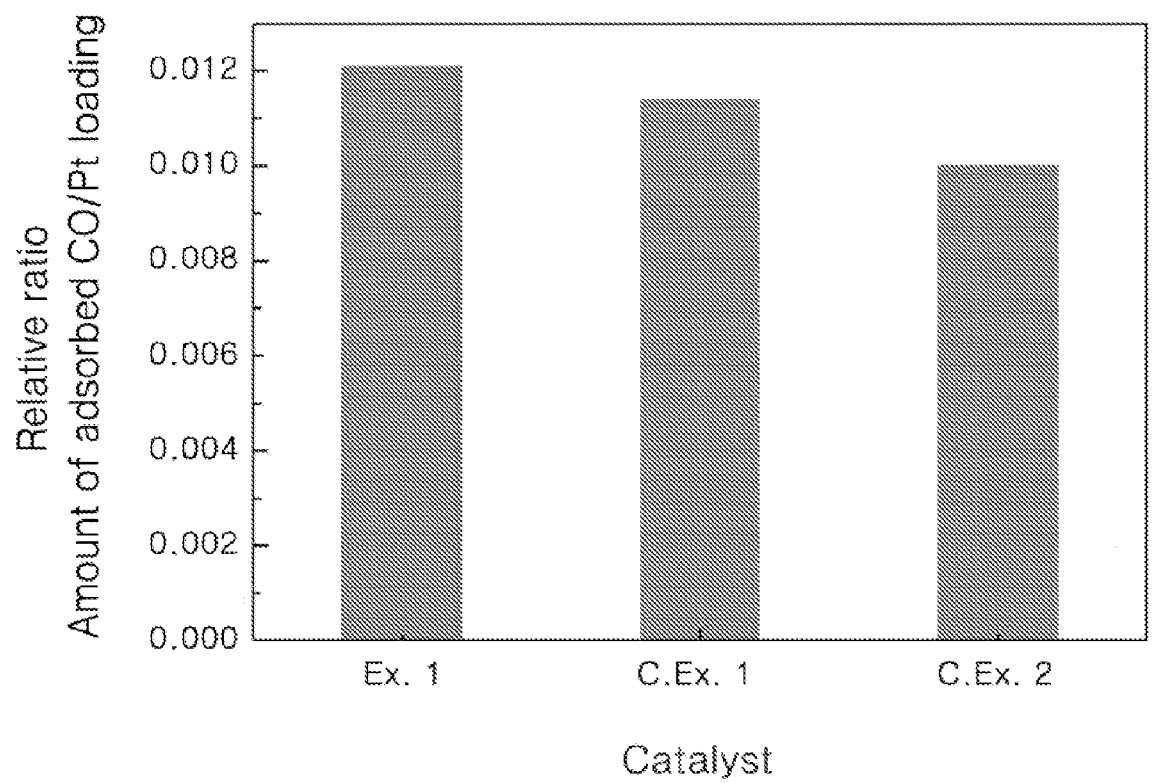
FIG. 6 is a graph showing the amount of CO adsorbed per unit mass of the supported catalyst of each of Example 1 and Comparative Examples 1 and 2.

As shown in FIG. 6, in the case of the cellulose catalyst support of Example 1 having the carbon nanotubes grown thereon, the amount of CO adsorbed per unit mass of platinum was similar to that of the carbon black (Vulcan XC-72, Carbot) of Comparative Example 1 or the $\gamma\text{-}Al_2O_3$ of Comparative Example 2, which is a commercially available support, but the amount of platinum adsorbed by the entire mass of the supported catalyst was determined to be 1.4 times higher than that of carbon black and 1.21 times higher than that of $\gamma\text{-}Al_2O_3$. This is considered to be because the case of the cellulose catalyst support having the carbon nanotubes grown thereon leads to a larger surface area per unit mass of catalyst than the case of carbon black or (—Al2O3, and thus, the amount of the nano-platinum catalyst particles to be supported thereon is increased, consequently increasing the amount of CO that is adsorbed on the active phase of the platinum catalyst. Further, all of the above three catalyst supports were similar in terms of the amount of CO adsorbed per unit mass of platinum (the supported amount of platinum was measured using ICP-OES elemental analysis). This is because the size and distribution of the platinum particles in the supported catalyst through the same CVD were shown to be similar in all of the above three cases.

Test Example 3

Carbon Dioxide Reforming of Methane

Using the supported catalyst of each of Example 1 and Comparative Examples 1 and 2, the carbon dioxide reforming reaction of methane was conducted as follows. The results were compared.

Each of the platinum-supported catalyst using the cellulose catalyst support of Example 1 having the carbon nanotubes grown thereon, the platinum-supported catalyst using the carbon black catalyst support of Comparative Example 1, and the platinum-supported catalyst using the $\gamma\text{-}Al_2O_3$ catalyst support of Comparative Example 2 was dried in an oven at 110° C. for 12 hours or longer, and was then placed in an amount of 0.1 g in a reactor for the carbon dioxide reforming reaction of methane. While 50 sccm of nitrogen was allowed to flow into the reactor filled with the catalyst, the temperature inside the reactor was increased to 700° C., which is the reaction temperature, at a heating rate of 10° C./min. When the temperature inside the reactor reached the reaction temperature, 20 sccm of each of methane and carbon dioxide at a molar ratio of 1:1 was allowed to flow into the reactor. The reforming reaction was conducted for 72 hours under the above reaction conditions. The gas discharged from the outlet of the reactor was directly introduced into a gas chromatographic system to subject the gas to elemental analysis using a thermal conductivity detector (TCD) and a flame ionization detector (FID). The conversion by the respective catalysts over the reaction time was calculated on the basis of the results of gas chromatography. The results are shown in FIG. 7.

Figure 7:
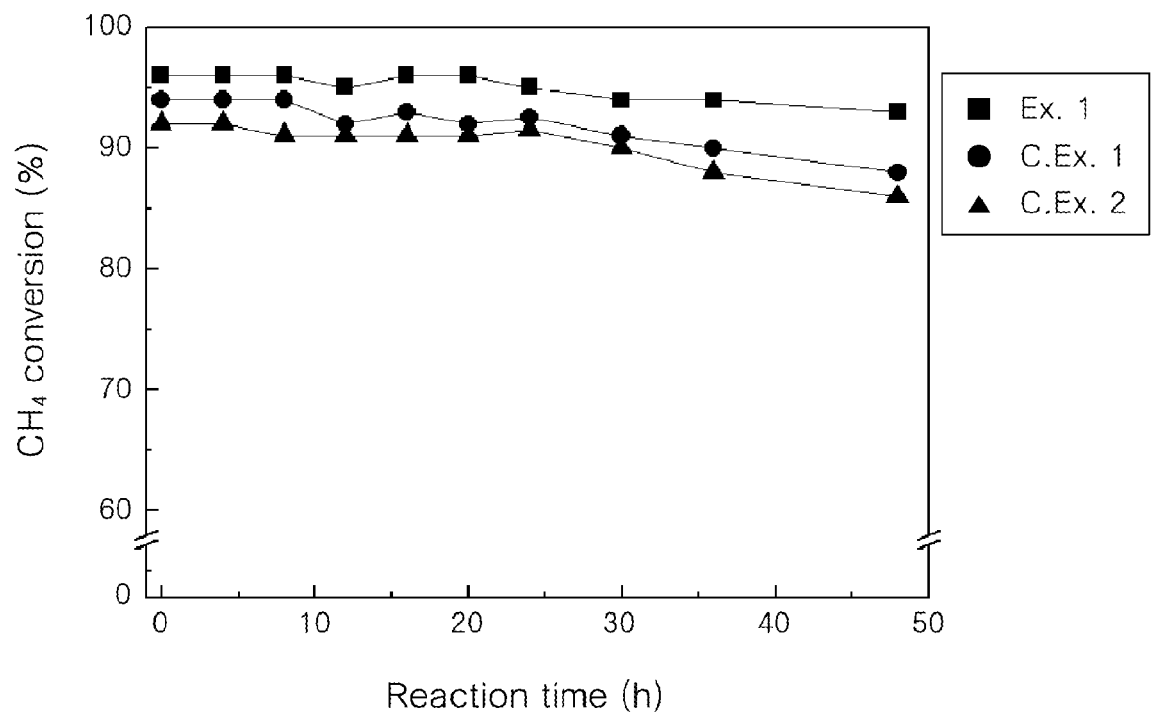
FIG. 7 is a graph showing the results of carbon dioxide reforming reaction of methane using the supported catalyst of each of Example 1 and Comparative Examples 1 and 2.

As shown in FIG. 7, in the reforming activity over time, the cellulose catalyst support of Example 1 having the carbon nanotubes grown thereon exhibited the greatest activity from the initial reaction to 48 hours after reaction. The activity was then shown in the sequence of the carbon black support (Vulcan XC-72, Carbot) of Comparative Example 1 and the $\gamma\text{-}Al_2O_3$ catalyst support of Comparative Example 2. In all of the catalyst supports, the catalytic activity was decreased over the reaction time. This was considered to be because the reforming reaction was conducted at a high temperature of 700° C., thus aggregating part of the nano-platinum catalyst, and also because a coke component, which was a byproduct of the reforming reaction, was deposited on the surface of the catalyst, thus blocking the catalytic active phase.

As described hereinbefore, the present invention provides a catalyst support using cellulose fibers, a preparation method thereof, a supported catalyst including a nano-metal catalyst supported on carbon nanotubes directly grown on the surface of the catalyst support, and a method of preparing the supported catalyst. According to the present invention, a novel porous catalyst support is developed to substitute for conventional catalyst supports, such as silica, alumina, zeolite, and other carbonaceous catalyst supports. In the present invention, as the catalyst support, useful is a cellulose material, which is considerably inexpensive such that the cost thereof is about $1/130$ of the cost of $\gamma$-alumina, serving as a catalyst support of conventional heterogeneous catalysts, about $1/310$ of the cost of silica, and about $1/150$ of the cost of carbon black (Vulcan XC-72R). The preparation of the catalyst support using cellulose fibers according to the present invention can be realized through a very simple process, thus generating economic benefits in terms of the preparation cost thereof. As well, the cellulose fibers have many pores and a large surface area (in the case of henequen, BET surface area is 200 $m^2/g$ or more), and are thus very advantageous for various catalytic reactions upon application as a catalyst support.

While the cellulose fibers are used as the catalyst support, the techniques for directly growing the carbon nanotubes and for supporting the nano-metal catalyst using CVD, as disclosed in Korean Patent Application No. 10-2007-0015801, are applied, thereby realizing high value of the catalyst, in particular, improving the performance of the catalyst.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of preparing a nano-metal-supported catalyst, comprising:

splitting cellulose fibers, thus preparing a cellulose catalyst support;

growing carbon nanotubes on the prepared catalyst support; and supporting a nano-metal catalyst on the catalyst support having the carbon nanotubes grown thereon, wherein the supporting the nano-metal catalyst on the catalyst support having the carbon nanotubes grown thereon comprises (E) removing the catalyst metal for growing carbon nanotubes from the carbon nanotubes grown on the surface of the cellulose catalyst support and performing pretreatment for supporting the nano-metal catalyst, and (F) supporting the nano-metal catalyst on the surface of the carbon nanotubes grown on the surface of the cellulose catalyst support, which is pretreated, using chemical vapor deposition, and wherein the performing the pretreatment in (E) is conducted through hydrochloric acid solution treatment, water washing, drying, and treatment at 50~70° C. for 5~300 min using an acid mixture solution of nitric acid and sulfuric acid.

2. The method as set forth in claim 1, wherein the preparing the cellulose catalyst support comprises (A) splitting the cellulose fibers into individual fibers on a micrometer scale and cutting the split fibers to a predetermined length, and (B) carbonizing the cut cellulose fibers.

3. The method as set forth in claim 1, wherein the cellulose fibers are selected from a group consisting of henequen, kenaf, abaca, bamboo, hemp, flax, jute, pineapple, ramie, and sisal.

4. The method as set forth in claim 1, wherein the growing the carbon nanotubes comprises (C) supporting a catalyst metal for growing carbon nanotubes on a surface of the carbonized cellulose catalyst support and (D) supplying a carbon source to a surface of the cellulose catalyst support supported with the catalyst metal for growing carbon nanotubes, thus growing the carbon nanotubes.

5. The method as set forth in claim 4, wherein the supporting the catalyst metal in (C) is conducted using an aqueous solution in which any one or a mixture of two or more selected from a group consisting of nickel, cobalt, and iron as the catalyst metal for growing carbon nanotubes is contained as a precursor.

6. The method as set forth in claim 1, wherein the nanometal catalyst is one or more selected from a group consisting of platinum, palladium, cobalt, molybdenum, and ruthenium.

7. The method as set forth in claim 1, the preparing the cellulose catalyst support comprising:
   splitting cellulose fibers into individual fibers on a micrometer scale;
   cutting the split cellulose fibers to a predetermined size; and
   carbonizing the cut cellulose fibers through thermal treatment.

8. The method as set forth in claim 7, wherein the split cellulose fibers are cut to 1~2 mm, and the cut cellulose fibers are heated to 500~1500° C. at a heating rate of 5~20° C./min in an atmosphere of hydrogen and nitrogen at a volume ratio of 1:1 and are then thermally treated at 500~1500° C. for 0.5~2 hours, thus preparing the catalyst support.

\* \* \* \* \*